Patented July 23, 1946

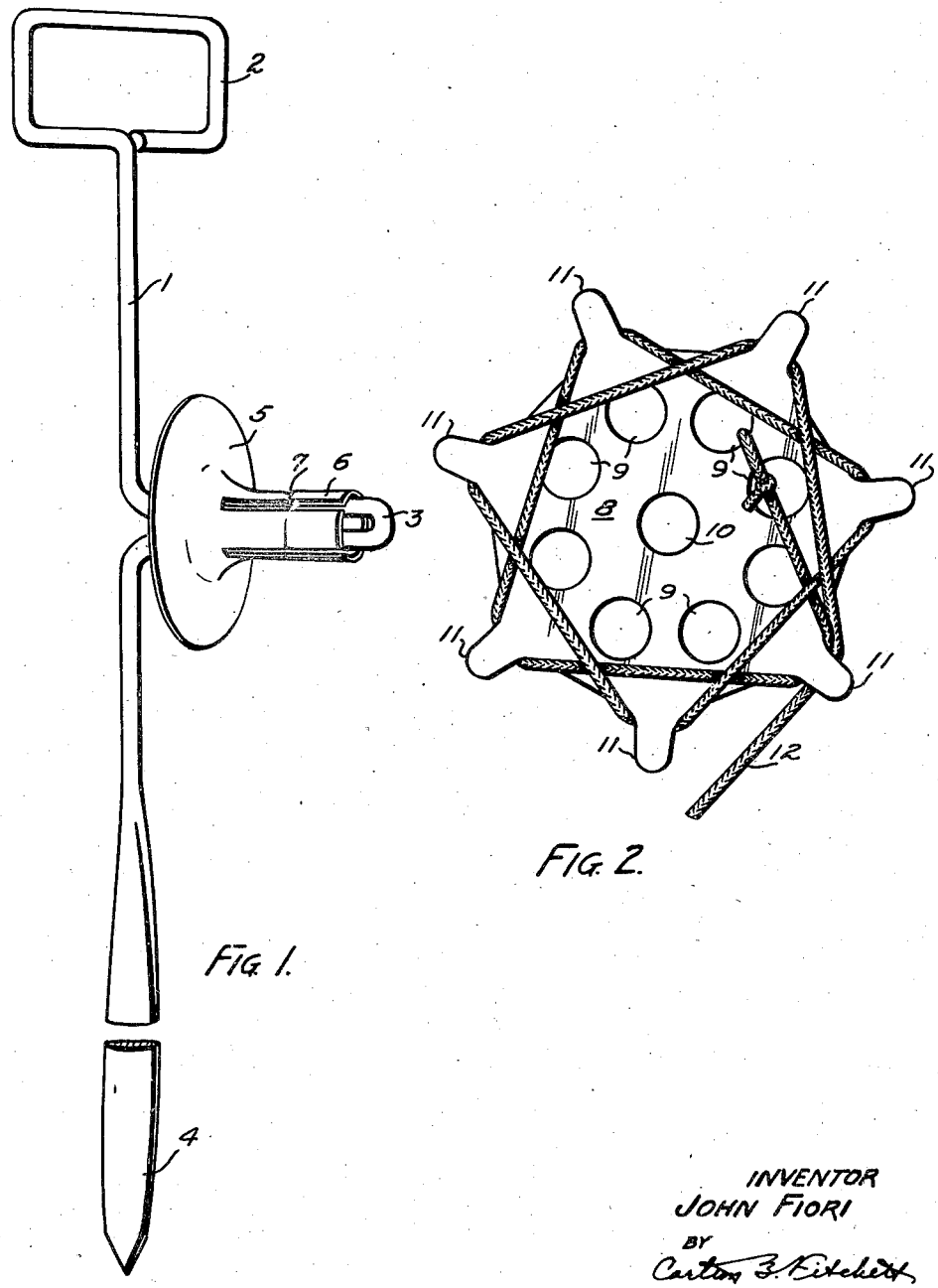

2,404,702

UNITED STATES PATENT OFFICE 2,404,702

FISHING REEL

John Fiori, Poughkeepsie, N. Y.

Application March 29, 1945, Serial No. 585,446

3 Claims. (Cl. 242—85)

This invention relates to improvements in a fishing drag line reel or devices of a similar nature.

One of the objects of the invention is to provide a convenient reel for a fish line or the like about which the line may be wound and which will permit proper drying of the same after the line has been wet.

A further object is to provide such a reel as will be convenient for carrying and use.

A still further object is to provide a reel which is of simple construction, is durable, is inexpensive to manufacture, is neat in appearance and is handy to use for the purpose intended.

With the above objects in view, the illustrated embodiment of the invention is comprised of a novel detachable holder or support for the reel, a removable bearing for the reel, and the flat, generally circular shaped reel proper, having on its perimeter an odd number of projections about which the line or the like is wound.

In the drawing:

Fig. 1 is an isometric side view of the holder with the removable reel bearing in place thereon.

Fig. 2 is a plan view of the reel plate showing two complete turns of line wound thereon.

In the embodiment of the invention shown, 1 is the holder rod, bent at the top to provide a hand grip 2, and having a reverse loop 3 at its approximate middle portion and a pointed end 4 on the bottom to allow it to be forced into the earth or between cleats in a boat when in use. Mounted on the reverse loop 3 in the holder 1, is a bearing 5, having split portions 6 to allow it to be forced over the reverse loop 3. At a midway point of the split portions 6 is a slight depression 7 which fits into V shaped indents (not shown) in a like location in the upper and lower members of the reverse loop 3 and secures the same to the loop. The reel plate, generally indicated at 8 is made from a thin piece (about 1/8" to 3/16" thick) of metal, preferably of stainless steel or aluminum or it can be made of a plastic suitable to withstand salt water. Numerous holes 9 are cut from the plate to allow air to circulate through the same. A central hole 10 is made of sufficient diameter to allow the reel plate to slip over the depressed ends of the split portions 6 of the bearing plate 5 and catch in depressions 7. When the end portions of 6 are released they will prevent reel plate 8 from backing off, and at the same time be loose enough in depressions 7 to permit the reel plate to rotate with a slight drag. This diameter is a matter of manufacture and further details are not needed here.

About the outer perimeter of the reel plate 8, an odd number of projections 11 are cut or stamped. A fish line 12 or the like is tied between any two of the holes 9 in the plate and the same wrapped about the various projections 11 in the manner shown in Fig. 2 where two complete turns are illustrated.

It is to be noted that due to the odd number of projections 11, no two uniform consecutive turns of the line will be fixed about the same projections, and that the chord-like sections of a turn of the line obtain their sole support between projections at the two points of crossing of the chord-like sections between projections of the immediately preceding turn made about the reel plate. It is from this feature that a line wound on a reel plate as here shown, will dry quickly and completely and the same will not have to be unwound and hung up to dry after being wet as is present practice.

The relatively small sections of the line in contact with each other will be dried by the free air circulation about the relatively large sections of the line not in contact with each other. In other words, the large quick drying sections of the line will act as a wick to draw the water from the small sections in contact and therefore slow to dry.

It is to be noted that the line may be wrapped about the projections 11 in a number of ways. If the chord-like sections are of uniform length throughout each complete turn of the line about the reel plate the resultant winding will be of the nature previously described. If the length of the chord-like sections comprising each complete turn be varied, care must be taken to see that the sections which comprise the next consecutive complete turn do not extend between the same projections 11 as did the sections which comprised the last previous turn in order to form a resultant winding of the nature previously described.

In the embodiment shown, the split bearing 5 has been found necessary to give proper support to the reel plate 8. The single indents (not shown) in the upper and lower portions of the reverse loop 3 were not sufficient to permit turning of the reel plate, and at the same time support the same against the pull of a fish where one person is using several of the devices as set lines. In this use, the point 4 is fixed in the ground or cleats of a boat and, the turning of a reel indicates that a fish has taken the bait on that line.

While I have shown and described but one form of my invention embodied in certain details of construction, it is to be understood that it is primarily for the purpose of illustrating the principles of the invention and that other forms and details of construction may be made without departing from the scope of the invention.

I claim:

1. A reel for fishing line or the like comprising a holder having a handle on one end and having a right angle projection at a middle portion and having a pointed portion on the other end, a detachable split bearing coacting with and slideable over the right angle projection of the holder and having a circular depression therein engageable on the inside with an indent in the right angle projection of the holder, and a flat plate having an odd numbered plurality of projections about its perimeter and having a plurality of holes therein grouped about the center thereof and a central hole therein coacting with the split bearing to slide over the depressed ends of the same and turnably engageable with the outside of the circular depression in the same.

2. A reel for fishing line or the like comprising in combination a holder, a right angle projection thereon, said projection having diametrically opposite indents formed on its exterior surface at the points of its greatest width in a plane normal to its longitudinal axis, a partially split circular hollow detachable bearing mounted over said projection and having a depression formed in the circumference of the split portion, said depression being detachably engageable on its inside perimeter with the said indents, and a flat plate having an odd number of projections about its circumference extending in the plane of the plate and in a direction away from the center of the plate, said plate having a central hole therein coacting with the said split bearing to slide over the depressed ends of the bearing and adapted to turnably and detachably engage the outside perimeter of the said depression whereby the said plate is solely supported by said depression.

3. A reel for fishing line or the like comprising a holder having a handle on one end and having a right angle projection at a middle portion and having a pointed portion on the other end, said right angle projection portion having diametrically opposite indents formed on its exterior surface at the place of its greatest width, a hollow tubular detachable split bearing coacting with and slidable over the said right angle projection portion of the holder and having a circular depression therein engageable on the inside with the said indents, and a detachable flat plate having a plurality of projections about its perimeter extending in the plane of the plate and having a central hole therein coacting with the said split bearing to slide over the depressed ends of the same and into the said depression whereby the said plate is solely supported by and turnably engageable with said bearing.

JOHN FIORI.